United States Patent

[11] 3,603,999

| [72] | Inventor | Benjamin Palleiko<br>Norwood, Mass. |
|---|---|---|
| [21] | Appl. No. | 809,263 |
| [22] | Filed | Mar. 21, 1969 |
| [45] | Patented | Sept. 7, 1971 |
| [73] | Assignee | Sanders Associates, Inc.<br>Nashria, N.H. |

[54] PULSED DOPPLER DETECTION SYSTEM
9 Claims, 3 Drawing Figs.

[52] U.S. Cl. .................................................. 343/17.1,
343/5 PD, 343/7 PF, 343/12 MD
[51] Int. Cl. ..................................................... G01s 7/28
[50] Field of Search ........................................ 343/7 PF,
12 MD, 17.1

[56] References Cited
UNITED STATES PATENTS

| 3,320,612 | 5/1967 | Crow et al. | 343/17.1 UX |
|---|---|---|---|
| 3,329,952 | 7/1967 | Bogle | 343/7 PF |
| 3,353,179 | 11/1967 | Cartwright | 343/12 MDI |
| 3,491,360 | 1/1970 | Stoorvogel | 343/17.1 PRF |

*Primary Examiner*—T. H. Tubbesing
*Attorney*—Louis Etlinger

ABSTRACT: Apparatus is herein disclosed for a pulsed doppler detection system comprising apparatus for generating pulsed pairs including a coherent pulsed oscillator wherein the return from target first pulse of a pair is mixed with the then currently generated second pulse of the same pair within the oscillator when the range delay is correct, and further including means for jittering the pulse pair to decorrelate out of range signals.

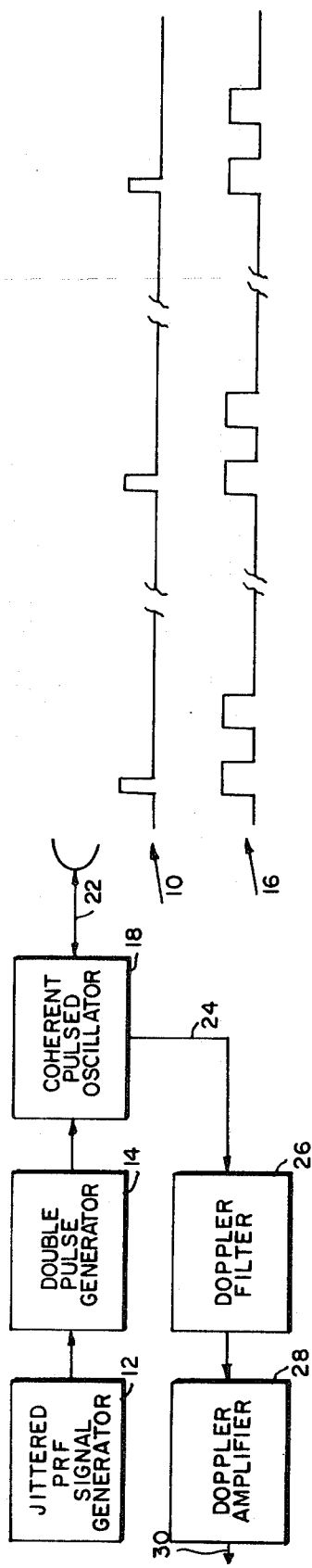
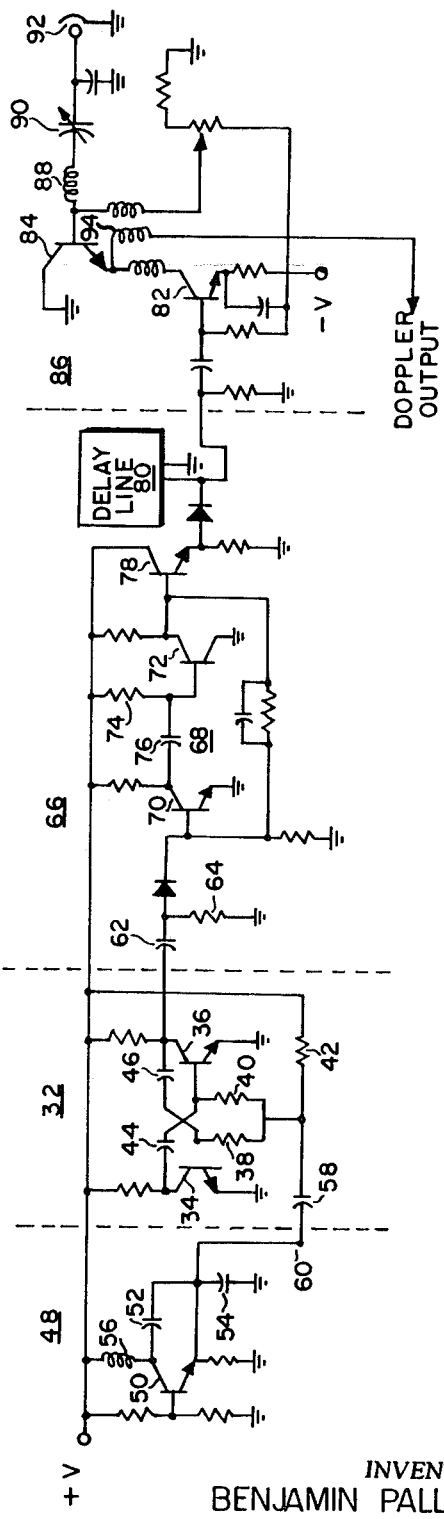
FIG. 2.
FIG. 1.
FIG. 3.
INVENTOR.
BENJAMIN PALLEIKO

PULSED DOPPLER DETECTION SYSTEM

BACKGROUND OF THE INVENTION

There are many applications which require detection of a target at a predetermined distance (range), for example, missile or bomb fuzing, personnel detectors or near miss indicators. In the past these type applications employed CW radar systems or conventional pulse systems. The CW systems are relatively simple but are sensitive to interfering signals and lack good range cutoff characteristics. The conventional pulse systems, which require dual antennas or RF switching and separate mixers, provide good range cutoff characteristics, however are relatively complex.

SUMMARY OF THE INVENTION

Accordingly, it is an object of this invention to provide a simplified pulsed doppler detection system.

It is another object of this invention to provide a pulsed doppler detection system having a combined oscillator, local oscillator and mixer.

It is a further object of this invention to provide a pulsed doppler detection system employing double pulsing wherein the second pulse of the pulse pair becomes the local oscillator pulse for the return from the first pulse of the pulse pair.

Briefly, a pulsed oscillator detection system is provided comprising apparatus for generating pulse pairs at a predetermined PRF, including a coherent pulsed oscillator wherein the return first pulse of a pulse pair is mixed with the second pulse being generated therein when desired target range occurs. The system further includes means for jittering pulse pairs to eliminate range ambiguities.

BRIEF DESCRIPTION OF THE DRAWINGS

The above-mentioned and other features and objects of this invention will become more apparent by reference to the following description taken in conjunction with the accompanying drawings, in which:

FIG. 1 is a block diagram of a pulsed doppler detection system;

FIG. 2 are sketches of simplified waveforms as generated by the system of FIG. 1; and FIG. 3 is a schematic illustrating detailed circuitry for one embodiment of the block diagram of FIG. 1.

DESCRIPTION OF A PREFERRED EMBODIMENT

Referring now to FIGS. 1 and 2, there is illustrated thereby an embodiment of a pulsed doppler detection system. A pulse train, such as signal 10 of FIG. 2, is generated by a PRF generator 12. Signal 10 has a predetermined PRF (pulse repetition frequency). The signal 10 is preferably jittered in a random or pseudorandom manner to eliminate range ambiguity (not illustrated for clarity in FIG. 2). This jittered signal is applied as the input signal to a double pulse generator 14 which generates a pulse pair for each input pulse. The pulse pair separation range gates the system. Since each input signal to the double pulse generator is jittered, the corresponding pulse pair will be jittered in like fashion. The output signal from pulse generator 14 is illustrated by signal 16 of FIG. 2 with jitter being omitted.

The output from double pulse generator 14 is applied to a coherent pulsed oscillator 18 for generating pairs of coherent RF pulses such as signal 20 of FIG. 2.

Pulsed oscillator 18 is coherent in that it has a predetermined starting phase.

The output of coherent pulsed oscillator 18 is transmitted by an antenna 22 which also acts as the receiving antenna.

The returned echo signal from a target is applied to coherent pulsed oscillator 18. When the range delay is correct, the target return from the first pulse of each pair mixes with the second pulse being currently generated in the oscillator, thus, providing a beat frequency doppler signal at an output 24. The second pulse of a pulse pair acts as the local oscillator for the return from the first pulse of the pair. The pulse pair is preferably jittered relative to preceding pulse pairs to reduce second time around signals and interfering signals. Note that the doppler signal may be extracted directly.

The return from previous pulses may, for certain ranges, fall directly on pulses of subsequent pairs being generated. However, the jitter on the PRF decorrelates these pulses to prevent the generation of doppler signals. Interfering signals are likewise decorrelated by the PRF jitter.

The doppler signal produced in oscillator 18 is filtered by a doppler filter 26 and amplified by an amplifier 28 with the resultant signal 30 being applied to a utilization means, for example, trigger circuits.

The doppler filter eliminates out-of-band signals and PRF components.

Referring now to FIG. 3, there is thereby illustrated one embodiment of the detailed circuitry for the elements illustrated in block form in FIG. 1.

The basic PRF of the system is generated by a PRF generator 32 which in this embodiment comprises a pair of transistors 34, 36 which form a free-running (astable) multivibrator. The PRF is determined by resistors 38, 40, 42 and capacitors 44, 46.

A Colpitts oscillator is employed as the jitter source for PRF generator 32. A transistor 50 forms the oscillator with the frequency thereof determined by a pair of capacitors 52, 54 and an inductor 56. The output from the jitter source 48 is applied via a capacitor 58 to frequency modulate the PRF on multivibrator 32. If desirable, noise jitter from a noise source (not shown) can be applied at point 60.

The output signal from PRF generator 32 is differentiated by a capacitor 62 and a resistor 64 and applied to a double-pulse generator 66.

Double-pulse generator 66 includes a monostable multivibrator 68 comprising transistors 70, 72 which receives the differentiated signal as a trigger thereto. When triggered, multivibrator 68 generates a single-pulse of length determined by a resistor 74 and a capacitor 76. The duration of this pulse determines the length of the RF pulse to be transmitted.

A transistor 78 provides power gain for the output signal from monostable multivibrator 68. This signal drives a delay line 80 and a transistor 82, simultaneously. When the pulse reaches the end of delay line 80 it is reflected and returns to the input of delay line 80; there it drives transistor 82 a second time, thus producing a double-pulse into transistor 82.

When transistor 82 is driven on, it connects a transistor 84 of coherent oscillator 86 to the supply voltage-V.

If the pulse rise time is sufficiently fast, it produces a coherent RF pulse. Inductor 88 and capacitor 90 determine the oscillator frequency. As previously mentioned, the RF pulse duration is determined by the multivibrator 68. This RF pulse output taken at point 92 is transmitted from the antenna (not shown).

Target returns from the correct range arrive at the oscillator when the second pulse of the pair is being generated. This return pulse beats with the second pulse, producing a modulated video signal at the emitter of transistor 84. An RF choke 94 couples out the doppler components from the oscillator.

In an alternate embodiment, only a signal pulse is employed. In which case, the target return beats with the trailing end of the pulse still being generated in the oscillator.

While I have described above the principles of my invention in accordance with specific apparatus, it is to be clearly understood that the description is made only by way of example and not as a limitation of the scope of my invention as set forth in the accompanying claims.

I claim:

1. A pulsed doppler detection system, comprising:
   means for generating a first signal comprising pulse pairs of a predetermined pulse repetition frequency;
   means for transmitting said signal;
   means for receiving a reflected signal from said transmitted signal; and means for generating a (second) doppler signal when the reflected pulse from a first pulse of a pulse pair is received coincident with the generation for the second pulse of said pulse pair, said reflected first pulse of a pair being mixed with said second pulse of said pair.

2. Apparatus as defined in claim 1, in which said means for generating a first signal includes:
- a signal generator for generating a pulse train at said predetermined pulse repetition frequency;
- a double-pulse generator coupled to said signal generator for generating a pulse pair for each pulse received from said signal generator, said pulse pair having a predetermined spacing between pulses; and
- a pulsed oscillator coupled to said double-pulse generator for generating an RF pulse for each pulse received from said double-pulse generator.

3. Apparatus as claimed in claim 2, in which said transmitting means includes an antenna coupled to said pulsed oscillator.

4. Apparatus as claimed in claim 3, in which said pulsed oscillator is coherent, each RF pulse generated thereby having the same starting phase.

5. Apparatus as defined in claim 4, in which said means for generating a doppler signal includes means for coupling a second output from said pulsed oscillator.

6. Apparatus as defined in claim 5, in which said means for generating a doppler signal further includes a filter coupled to said second output of said pulsed oscillator.

7. Apparatus as defined in claim 6, in which said means for generating a doppler signal further includes an amplifier coupled to said filter.

8. Apparatus as defined in claim 5, further including means for jittering each of said pulse pairs.

9. A pulsed doppler detection system, comprising:
- means for generating an RF pulse including an oscillator;
- means for transmitting said pulse;
- means for receiving a reflected signal from said transmitted signal; and
- means for generating a doppler signal in said oscillator when the reflected pulse is received coincident with the generation of the latter portion of said generated pulse.